Sept. 25, 1934.   R. DE VAAL   1,974,705
MEANS FOR TURNING STATIONARY VEHICLES
Filed May 25, 1931
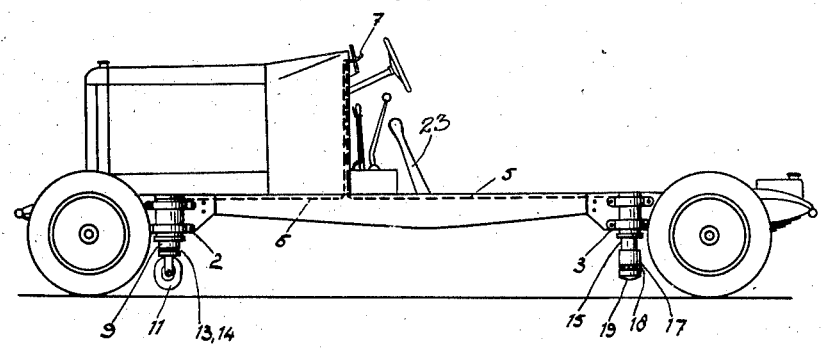
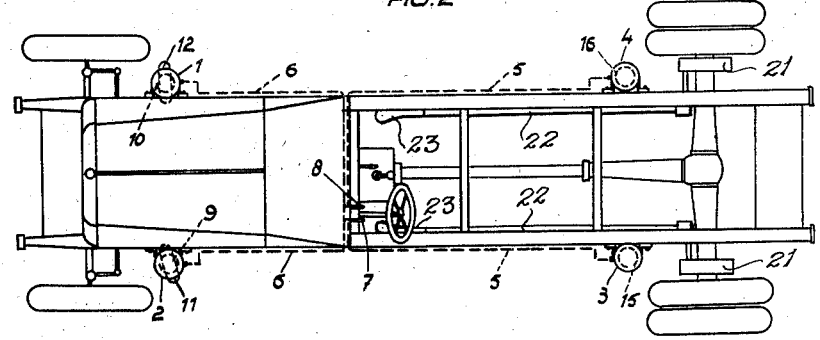
R. de Vaal INVENTOR
By: Marks & Clerk Attys.

Patented Sept. 25, 1934

1,974,705

UNITED STATES PATENT OFFICE 1,974,705

MEANS FOR TURNING STATIONARY VEHICLES

Roelof de Vaal, Rotterdam, Netherlands, assignor of one-half to Hubertus Cornelis Brinkers, Zegwaard, Netherlands Application May 25, 1931, Serial No. 539,867
In the Netherlands September 22, 1930

5 Claims. (Cl. 180—1)

This invention relates to a vehicle underframe, and its main object is to provide means thereon by the aid of which the vehicle can be turned in narrow streets or paths without the difficult and tedious procedure that is usually necessary. The device according to the invention is particularly useful in the case of a vehicle which has been parked in a compact row, along the edge of a pavement for instance, as it enables the vehicle to be taken out without any risk of damage either to the vehicle itself or to an adjacent vehicle.

The vehicle underframe according to the invention is characterized by a lifting device for substituting the usual vehicle-supporting means by a substantially vertical pivot, and a rolling support adapted to enable the vehicle to be swung round about the said pivot.

When this lifting device is brought into operation the vehicle can be swung round its vertical pivot, the arrangement of which on the vehicle underframe will of course be so selected that the said swinging movement requires as little space as possible.

In the case of vehicles driven by mechanical power, where the said power can be utilized for swinging the vehicle round the vertical pivot, this pivot, according to the invention, is arranged in the neighbourhood of one of the driving wheels, for the purpose of raising this wheel, which may be provided with an independently acting braking device, while the rolling support replaces the support of the other wheels. After the engagement of the lifting device, and braking of the raised wheel, if necessary, the other driving wheel is positively driven in a suitable direction for swinging the vehicle about its vertical pivot. In the case of vehicles with fourwheel drive, by electric motors for example, or with coupled driving wheels, a braking device for the raised wheel is not required.

According to the present invention there is preferably provided, in the neighbourhood of each driving wheel, a lifting member constituting a pivot in the manner set forth, the said lifting members admitting of being brought into operation alternatively, for the purpose of swinging the vehicle to the right or to the left as desired.

The above-mentioned lifting means may each consist, according to the invention, of a vertically movable support provided with a foot rotatable about the vertical axis. In this case, therefore, the foot, that is to say, the actual bearing surface of the lifting member, may remain standing firmly on the ground, so that the friction produced by the swinging of the vehicle is reduced. For the purpose of further diminishing the friction, the lifting member has according to the invention the form of a block which is divided along a transverse plane, and the parts of which are separated by a ball or roller bearing.

According to the invention the above-mentioned rolling support may be formed of two vertically movable carriers, preferably arranged each in the neighbourhood of one wheel of the pair of wheels in question, for a rolling body supported with at least two degrees of freedom.

Although a mechanical driving of the lifting members and carriers is possible, by means of screw spindles, toothed racks or the like, the controlling of the lifting device is according to the invention preferably effected by hydraulic means from the driver's seat, which has the advantage from the point of view of mechanical driving that the device may be considerably simpler, and therefore requires less space, and is easier to control.

The invention is diagrammatically illustrated in one form of construction in the accompanying drawing, in which Figure 1 shows in side elevation a motor-car underframe equipped with a turning device according to the invention, and Figure 2 shows a plan of the same underframe.

On the vehicle underframe, which in other respects may be constructed in the usual manner, there are provided in the constructional example illustrated four hydraulic cylinders 1, 2, 3 and 4, which can be operated from the driver's seat by means of pipes 5 and 6, and cocks 7 and 8, in the manner which is usual for hydraulic lifting jacks, so that further description thereof is not necessary.

In the hydraulic cylinders 1 and 2, which are located in the neighbourhood of the front wheels of the vehicle underframe, are provided pistons 9 and 10 respectively, which form carriers for rollers 11 and 12, which are connected with these carriers by universal joints 13 and 14, in such a way that they can revolve freely. The other hydraulic cylinders 3 and 4, which are located in the neighbourhood of the rear wheels of the vehicle, contain pistons 15 and 16, which each carry at the lower end a block 17. This block 17 is divided in a transverse direction, and between the parts a ball bearing 18 is provided, in such a way that when the lower part, forming the actual foot 19, is resting on the ground, rotation about a vertical axis, namely the centre line of the piston, is easily possible with very little friction.

the driving of the lifting device may be mechanically obtained from the vehicle motor, or from a gaseous motive fluid.

The driving wheels are each provided with a special braking device 21 operated through a connecting rod 22 by a lever 23. The apparatus is used in the following manner:—

If the vehicle has been parked for example in a line with other vehicles beside the curb, where the vehicles are ordinarily arranged close together in twos with the front ends facing one another, it has hitherto been very difficult for a vehicle to be withdrawn from such a row, because it is not possible to run backwards far enough. If, however, the vehicle is provided with a device according to the invention, the driver need only admit the pressure fluid, which comes from a compressor for example, into the cylinder of that particular lifting member or piston 15 which is farthest from the curb, and into the cylinders 1 and 2 of the rolling supports. The vehicle is then somewhat raised at three points, the rear wheel adjacent to the pavement remaining on the ground. Thereupon the lifted rear wheel will be braked by operating the brake lever 23, and the vehicle clutch closed in such a way that the wheel remaining in contact with the ground produces a turning moment which swings the vehicle about a vertical axis, namely the centre line of the piston 15. As soon as the front of the vehicle has been brought far enough out of the line of vehicles, the brake is released, the pressure fluid is allowed to escape from the cylinders, and the vehicle can be let down on to its four wheels again, whereupon it is ready to move away. It is clear that for the complete turning of the vehicle exactly the same procedure may be adopted, so that the space required need not be any greater than the length of the vehicle.

The invention is not limited to the form of construction described and illustrated, but may be modified in various ways. Thus, if desired, the driving of the lifting device may be mechanically obtained from the vehicle motor, or from a gaseous motive fluid.

What I claim is:—

1. In an apparatus for turning motor vehicles, a lifting device attached to the front of the vehicle for raising the front wheels clear of the ground, said lifting device including a ground engaging wheel, a lifting jack arranged in close proximity to one rear drive wheel of the vehicle having a ground engaging member adapted to lift the latter wheel clear of the ground whereby the last mentioned lifting device may act as a fulcrum about which the vehicle may be turned by the tractive effect of the other rear wheel which remains on the ground.

2. An apparatus as claimed in claim 1, characterized by the provision of an additional lifting device arranged in close proximity to the other drive wheel of the vehicle, the two last mentioned lifting devices being arranged laterally and at opposite sides of the longitudinal axis of the motor vehicle.

3. An apparatus as claimed in claim 1, characterized by the provision of an additional lifting device arranged in close proximity to the other drive wheel of the vehicle, the two last mentioned lifting devices being arranged laterally and at opposite sides of the longitudinal axis of the motor vehicle, the two last mentioned lifting devices being independently operable.

4. An apparatus as claimed in claim 1, characterized by the provision of means mounting the ground engaging member to turn about a vertical axis to permit turning movement of the motor vehicle with relation thereto.

5. An apparatus as claimed in claim 1, characterized by the provision of a friction reducing bearing associated with the ground engaging member permitting the latter to freely turn about a vertical axis.

ROELOF DE VAAL.